United States Patent [19]

Misencik et al.

[11] 4,208,688
[45] Jun. 17, 1980

[54] MULTIPOLE GROUND FAULT CIRCUIT INTERRUPTER WITH TRIP LEVEL ADJUSTMENT

[75] Inventors: John J. Misencik, Shelton; Ronnie D. Davidson, Bridgeport, both of Conn.

[73] Assignee: Westinghouse Electric Corp., Pittsburgh, Pa.

[21] Appl. No.: 941,996

[22] Filed: Sep. 13, 1978

[51] Int. Cl.² .............................................. H02H 3/28
[52] U.S. Cl. ..................................................... 361/46
[58] Field of Search ............................. 361/44, 45, 46

[56] References Cited
U.S. PATENT DOCUMENTS

| | | | |
|---|---|---|---|
| 3,604,982 | 9/1971 | McDonald | 361/46 |
| 3,676,737 | 7/1972 | Garzon | 361/45 |
| 3,852,642 | 12/1974 | Engel et al. | 361/45 |
| 3,999,103 | 12/1976 | Misencik et al. | 361/45 |
| 4,015,169 | 3/1977 | Misencik | 361/45 |
| 4,056,837 | 11/1977 | Misencik et al. | 361/45 |
| 4,080,640 | 3/1978 | Elms et al. | 361/45 |

Primary Examiner—Harry E. Moose, Jr.
Attorney, Agent, or Firm—G. H. Telfer

[57] ABSTRACT

Multipole ground fault circuit interrupter apparatus with a compensation network for maintaining a constant trip level despite less than all power poles being energized. The compensation network has matched resistors respectively connected to each power pole and an additional resistor connected to the common point of the matched resistors in a branch passing through the differential current transformer core from the load side to the supply side and connected to the neutral conductor, producing a desensitizing current when less than all poles are energized.

5 Claims, 2 Drawing Figures

MULTIPOLE GROUND FAULT CIRCUIT INTERRUPTER WITH TRIP LEVEL ADJUSTMENT

BACKGROUND OF THE INVENTION

This invention relates to ground fault interrupters for personnel protection and particularly to such interrupters adapted for use in multipole applications.

In Misencik et al. U.S. Pat. No. 3,999,103, Dec. 21, 1976, is disclosed a multipole ground fault circuit breaker with interrupting capability in the event of a ground fault from any one of two or more line conductors or power poles of an alternating current electrical distribution system that includes, in addition to the line conductors, a neutral conductor that is grounded proximate the alternating current source. Features of such apparatus are also disclosed in Misencik U.S. Pat. No. 4,015,169, Mar. 29, 1977, and copending application Ser. No. 558,618, filed Mar. 14, 1975 by Zakrzewski et al., assigned to the present assignee, now abandoned. The experience to the present with such apparatus has been generally quite satisfactory. However, there is an aspect of its manner of operation that can cause undesirable operation under some circumstances.

Ground fault interrupters for personnel protection are required by industry standards to maintain a trip level that is nominally 5 milliamperes, that is the current level produced by a ground fault which causes interruption is to be in any given device equal to 5 milliamperes plus or minus 1 milliampere. Achievement of this trip level is readily within the capability of the apparatus described in the foregoing patents and application. With both poles of a two pole ground fault circuit breaker energized, which is the normally expected case, a satisfactory trip level within the standard is produced. But, with only one of the two poles energized, it has been found by experience that there is a tendency for the trip level to be reduced to a lower than desirable level. That is, the amount of current causing interruption can therefore be so low as to cause nuisance tripping of the apparatus. It is primarily with respect to the problem of providing an easy means of trip level adjustment in multipole ground fault interrupters that the present invention is directed.

The trip level is primarily determined by the characteristics of the sensing amplifier and trip circuit of the device. A given amplifier and trip circuit is subject to possible variation in performance depending on how it is biased. For example, a sense amplifier and trip circuit that has been found to be very useful is that disclosed in Engel et al U.S. Pat. No. 3,852,642, Dec. 3, 1974, which has an advantage of being operable on a half-wave rectified supply, as well as a full-wave rectified supply. In the latter case, encountered in multi-pole applications, the off-time of the amplifier is reduced to a minimum.

It is found that if a unit is designed and made to have a trip level of 5.0 ma. on a full-wave supply, that same unit will exhibit a reduced trip level on a half-wave supply. The amplifier for a 2-pole GF breaker is set at 5.0 ma. assuming both poles are on. If the unusual occurs in the use of such a unit and the user forces the handle for one pole on and the other pole off, then the amplifier is seeing a half-wave rectified supply that reduces the trip level, typically about 0.5 ma. That is, if a unit is tested and found to operate at a trip level in the low part of the acceptable range, say 4.2 ma. with both poles energized, it could have a trip level of 3.7 ma., outside the desired range, with only one pole energized. This invention is aimed to correct that situation.

In part, the present invention utilizes principles discussed in Misenick et al U.S. Pat. No. 4,056,837, Nov. 1, 1977 which shows how a resistive circuit branch connected between line and neutral conductors on opposite sides of a differential current transformer of a GFI influences the effective trip level of the device.

Another situation has been found in multi-pole GFI applications which is to be improved. Where the electrical system is three phase, the phase relation of the line voltages is such as to reduce the trip level. So if a given unit is made to exhibit a 5.0 ma. trip level on single phase operation from two poles, its trip level is reduced if applied to a three phase system, even if all poles of the three phase system are on. An aspect of the invention is therefore to extend the utility of GFI's for permitting application of a single unit to either single or multiphase applications.

SUMMARY OF THE INVENTION

In accordance with the present invention, the circuitry of a multipole ground fault interrupter, which may be generally of the type as described in U.S. Pat. Nos. 3,999,103 and 4,015,169 and in pending application Ser. No. 558,618 or of any other similar type of multipole ground fault interrupter, is modified by the addition of a compensation network to prevent trip level reduction due to selective pole operation, that is with less than all poles energized. The compensation network comprises matched impedances, preferably resistors, connected respectively to each of the input hot lines and with the impedances having their other terminals connected to a common point from which a third impedance, preferably also a resistor, is connected in a circuit branch extending through the core of the differential current transformer in a direction from the load side to the supply side and terminating by connection with the neutral conductor.

This added compensation network permits achievement of the desired 5 milliampere plus or minus 1 milliampere trip level under conditions of a single pole being energized of the multipole apparatus by permitting the trip level to be set by selection of the third impedance. This impedance will determine the amount of current flowing through the circuit branch in the transformer core that tends to desensitize the apparatus and provide somewhat of an elevation of trip level. In the event that all poles are energized, in a single phase system, then the compensation network has no effect on operation, including no effect on the originally-intended trip level.

Furthermore, the compensation network can be used to provide a continuing function in three phase applications by providing a desensitizing current even with all poles on.

It can be seen the compensation network of the present invention has unique features and capabilities as compared with the apparatus described in U.S. Pat. No. 4,056,837 on trip level adjustment.

Further aspects of the arrangements in accordance with the present invention and their operation will be found by reference to the drawing and the ensuing description.

PREFERRED EMBODIMENTS OF THE INVENTION

Incorporation by reference is made of U.S. Pat. Nos. 3,999,103 and 4,015,169 and copending application Ser. No. 558,618 that were referred to in the Background. A multipole ground fault interrupter circuit breaker is therein described in which the present invention may be advantageously used. Also incorporated is the description of the above mentioned U.S. Pat. No. 3,852,642 that describes a circuit exhibiting operability at somewhat different trip levels on a half-wave supply and a full-wave supply.

Figure 1:
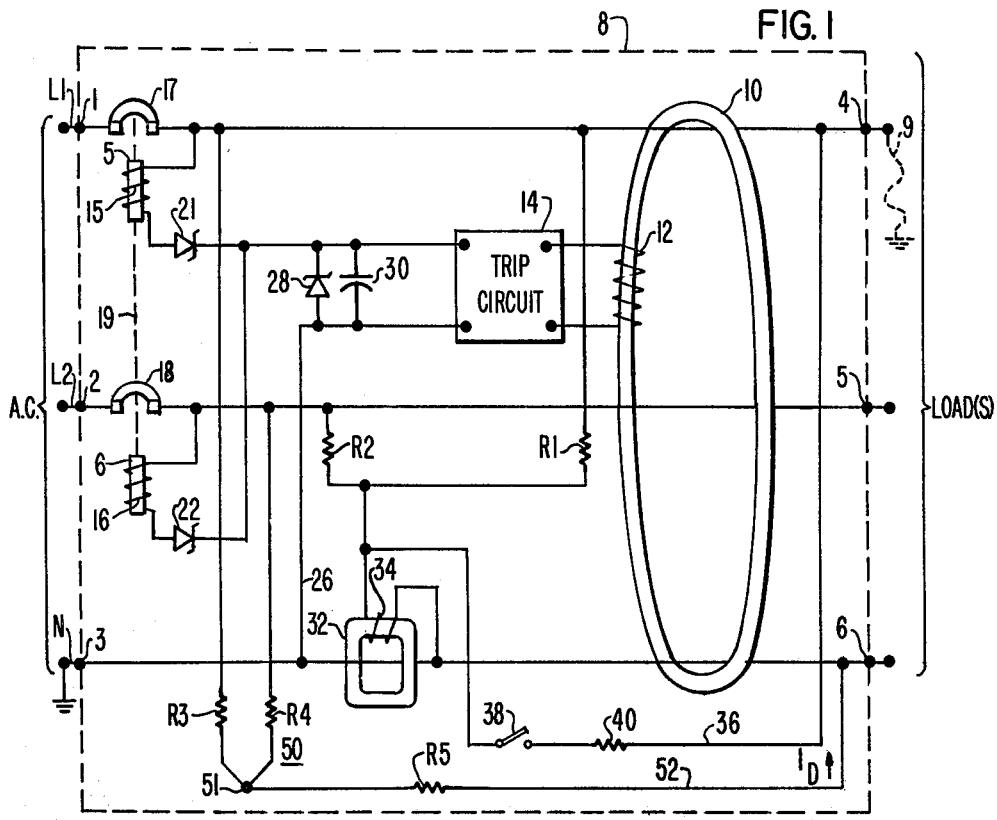
FIG. 1 is a circuit schematic diagram of an embodiment of the present invention in a single phase application.

Referring to FIG. 1, there are shown two power conductors L1 and L2 and a neutral conductor N of a three-wire AC power distribution system. Each of the line conductors L1 and L2 carry equal and opposite voltages such as in a 120/240 volts single phase electrical distribution system. The neutral conductor N is grounded proximate the supply. Within the dashed line box 8 are generally included those elements of the apparatus that are contained within the unit normally made and sold as a ground fault interrupter circuit breaker which has terminals 1 through 6 provided for connection with the distribution system conductors that are external to the unit. The apparatus could be contained in an electrical wall receptacle or a portable ground fault interrupter unit as well as in a circuit breaker intended to be mounted in the load center of a distribution sytem.

The conductors L1, L2 and N pass through a magnetic core 10 of a differential current transformer preferably as single turn primary windings. The core also has a secondary sensing winding 12 wound on the core in normally a plurality of turns. The leads of the sensing winding 12 go to a sensing amplifier and trip circuit 14. The amplifier and trip circuit 14 responds to signals developed by the sensing winding 12 as a result of current imbalances in the primary conductors that are indicative of a ground fault that may be harmful, such as a line to ground resistive path as indicated at 9. If such an imbalance occurs, the trip circuit 14 causes the opening of circuit breaker mechanisms 17 and 18 and resulting protection for an individual who may be in the ground path 9 from the line conductor. Solenoid trip coils 15 and 16 are individually provided in association with breaker contacts 17 and 18 with one end of each connected to respective line conductors L1 and L2. The mechanisms are preferably connected together (dashed line 19) for concurrent operation of the breaker contacts on each of the line conductors. The other end of the trip coils 15 and 16 are connected to respective zener diodes 21 and 22 which are poled in the same direction between the respective lines L1 and L2 and a common lead to the trip circuit 14. Other aspects with respect to the supply of power to the trip circuit, including lead 26, zener diode 28, and capacitor 30, and the manner of operation and character of suitable trip circuits are discussed in referred-to U.S. Pat. Nos. 4,015,169 and 3,852,642.

In accordance with preferred practice, the apparatus comprises a grounded neutral transformer core 32 with a primary winding 34 that is connected through respective different valued resistors R1 and R2 to the line conductors L1 and L2 and whose secondary is the neutral conductor N. The purpose and nature of operation of the grounded neutral transformer and its connection are described more fully in copending application Ser. No. 558,618.

The apparatus also includes a test circuit branch 36 connected between a point on L1 on the load side of the differential transformer 10 and a point on the line side of the primary winding 34 of the grounded neutral transformer. This branch includes a manually-operable switch 38 and a resistor 40 for establishing a current flow to check the operability of both the differential current transformer 10 and the grounded neutral transformer 32. Further description of this portion of the apparatus is in U.S. Pat. No. 3,930,187, Dec. 30, 1975, by Misencik.

The portions of the apparatus thus far described are merely exemplary of a preferred embodiment in which the present invention is used. The invention pertains most directly to a compensation network 50 that has individual matched resistors R3 and R4 respectively connected to each of the line conductors L1 and L2 on the supply side of the transformer 10. The resistors R3 and R4 are connected at their other ends to a common point 51. The reason for having these resistors or other current developing impedances in the individual circuit branches to the line conductors is because at some time a user might deenergize one pole of the multi-pole breaker and produce a reduction in trip level of trip circuit 14 that has a characteristic difference in performance when its bias changes from full-wave rectified, as produced by both poles being on, to half-wave rectified, with one pole off.

The resistors R3 and R4 are closely matched, such as within about 1%, to ensure that they do not modify the trip level of the apparatus when both power poles L1 and L2 are energized. R3 and R4 are also of appreciable impedance value, such as greater than 100,000 ohms each, to maintain an adequate isolation between L1 and L2. From the common point of R3 and R4 there is connected another resistor R5 whose other end is connected to the neutral conductor N by a conductor 52 that extends around the core to the supply side of the transformer.

With both poles L1 and L2 energized, that is carrying their normally-intended current and voltage, there is zero current through the compensation network because the currents developed by R3 and R4 are equal and opposite and cancel each other at common point 51. Hence, when both poles are energized, the compensation network 50 produces no effect on the operation of the apparatus.

When only one of the power poles L1 or L2 is energized, there is a net current flow through the compensation network and a desensitizing current $I_D$ flows through conductor 52 that reduces the sensitivity of the apparatus. The desensitizing current $I_D$ equals the voltage on the energized pole divided by the sum of the resistor R3 or R4 connected to that pole plus R5; i.e., $$\frac{\text{Voltage } (L1)}{R3 + R5} \text{ or } \frac{\text{Voltage } (L2)}{R4 + R5}.$$

This amount of current desensitizes the apparatus because it requires that an additional ground fault current of that amount, in addition to the fault current otherwise required, be drawn to cause the apparatus to be actuated.

For example, typical actual values encountered in practice are:

| | |
|---|---|
| Trip level with both poles energized | 5 ma. ± 1 |
| Trip level with only 1 pole energized, without compensation | 4.5 ma. ± 1 |
| Resistor values for compensation in a 120/240 v. system: | |
| R3 | 120k ohms. |
| R4 | 120k ohms. |
| R5 | 10k ohms. |

The invention is also applicable to ground fault interrupters of more than one phase. For example, application of the invention has been made to three phase apparatus having nominal voltages such as 120/208 volts.

Figure 2:
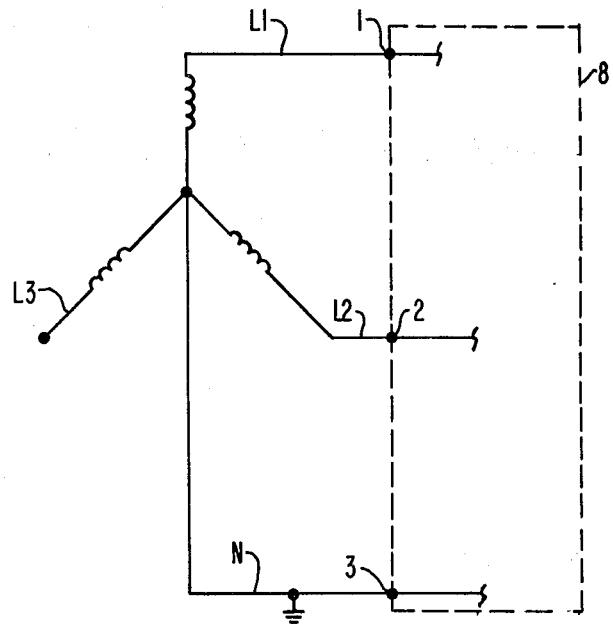
FIG. 2 is a partial schematic diagram of a three phase application of the invention.

FIG. 2 shows a representative connection of a ground fault circuit breaker 8, as in FIG. 1, to a 3-phase wye distribution system. Here the compensation network 50 in the unit 8 will supply a densitizing current $I_D$ in branch 52 throughout operation when either or both L1 and L2 are on. In this arrangement the third phase lead L3 goes to another breaker and does not influence operation of the unit 8.

As a result of the practice of the invention in accordance with the foregoing description, it will be seen that it provides a way to avoid overly-sensitizing the apparatus as a result of only one pole of the multipole system being energized while fully preserving the capability of the apparatus when all poles are energized, in either a single phase system or a three-phase system. Thus, there is achieved through a relatively simple expedient not unduly complicating the apparatus or its ability to be made economically and compactly, a system that provides a uniform trip level under a variety of conditions.

We claim:

1. A multipole ground fault circuit interrupter comprising:

a differential transformer core, a plurality of primary windings on said core including at least two line conductors L1 and L2 and a neutral conductor for connection with the conductors of an AC electrical distribution system;

a secondary sensing winding on said core for sensing current unbalance between said primary windings;

means responsive to a predetermined sensed signal on said sensing winding to open said line conductors; and means for providing a desensitizing current when one of said line conductors L1 and L2 is energized and the other is not energized, said desensitizing current being absent when both said line conductors L1 and L2 equally and oppositely are energized.

2. A two pole ground fault circuit interrupter in accordance with claim 1 wherein:

said means for providing a desensitizing current comprises a compensation network connected between said line conductors and said neutral conductor, said compensation network including two impedances respectively connected to each of said line conductors at one of their terminals, the other terminals thereof having a common connection, said two impedances being of matched characteristics, said compensation network also including an additional impedance connected between said common point and said neutral conductor in a circuit branch which connects to said neutral conductor.

3. A multipole ground fault circuit interrupter in accordance with claim 2 wherein:

each of said impedances of said compensation network is a resistor.

4. A multipole ground fault circuit interrupter in accordance with claim 1 wherein:

said distribution system is a three-wire, single phast distribution system.

5. A multipole ground fault circuit interrupter in accordance with claim 1 wherein said distribution system is a three phase voltage distribution system and said compensation network provides a densitizing current both when a single pole is on and when two poles are on.

* * * * *